(12) United States Patent
Zhao et al.

(10) Patent No.: US 10,958,780 B1
(45) Date of Patent: Mar. 23, 2021

(54) DECENTRALIZED AUTOMATIC PHONE FRAUD RISK MANAGEMENT

(71) Applicant: ALIPAY (HANGZHOU) INFORMATION TECHNOLOGY CO., LTD., Hangzhou (CN)

(72) Inventors: Wenqiang Zhao, Hangzhou (CN); Yanpeng Li, Hangzhou (CN); Boyan Jia, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/945,502

(22) Filed: Jul. 31, 2020

Related U.S. Application Data

(63) Continuation of application No. PCT/CN2019/110637, filed on Oct. 11, 2019.

(51) Int. Cl.
| | |
|---|---|
| *H04M 17/00* | (2006.01) |
| *H04M 15/00* | (2006.01) |
| *H04M 3/42* | (2006.01) |
| *H04M 3/22* | (2006.01) |
| *H04L 9/06* | (2006.01) |

(52) U.S. Cl.
CPC ...... *H04M 3/42042* (2013.01); *H04L 9/0637* (2013.01); *H04M 3/2281* (2013.01); *H04M 3/42068* (2013.01)

(58) Field of Classification Search
CPC .. H04M 1/66; H04M 3/2281; H04M 3/42042; H04M 3/42068; H04M 7/0078; H04M 15/47; H04M 2203/6027; H94M 2215/0148; H04L 9/0637

USPC ........ 379/114.14, 127.02, 145, 189, 207.13, 379/207.15
See application file for complete search history.

(56) References Cited

U.S. PATENT DOCUMENTS

| | | | | |
|---|---|---|---|---|
| 10,373,158 | B1 * | 8/2019 | James | ..................... G06Q 20/40 |
| 10,540,653 | B1 * | 1/2020 | James | ................... G06Q 20/065 |
| 10,540,654 | B1 * | 1/2020 | James | .................. G06Q 20/223 |
| 10,693,954 | B2 * | 6/2020 | Kozloski | ................... G06F 7/14 |
| 2015/0288791 | A1 | 10/2015 | Weiss et al. | |

(Continued)

FOREIGN PATENT DOCUMENTS

| | | |
|---|---|---|
| CN | 102572124 A | 7/2012 |
| CN | 104602240 A | 5/2015 |

(Continued)

*Primary Examiner* — Khai N. Nguyen
(74) *Attorney, Agent, or Firm* — Seed IP Law Group LLP

(57) ABSTRACT

Disclosed herein are methods, systems, and apparatus, including computer programs encoded on computer storage media, for phone fraud prevention. One of the methods includes adding a first identifier of a first phone event of a first user into a blockchain managed by one or more devices on a decentralized network. The first identifier of the first phone event is classified into a list of phone fraud identifiers. A second identifier of a second phone event involving a second user is received. The second identifier is compared with the list of phone fraud identifiers that includes the first identifier. In a case where the second identifier matches a phone fraud identifier in the list of phone fraud identifiers, the first user is notified that the second phone event involves a risk of phone fraud.

18 Claims, 6 Drawing Sheets

(56) References Cited

U.S. PATENT DOCUMENTS

| | | | |
|---|---|---|---|
| 2017/0236094 A1* | 8/2017 | Shah | G06Q 10/101 |
| | | | 705/300 |
| 2018/0255130 A1* | 9/2018 | Kozloski | H04L 67/22 |
| 2019/0122258 A1* | 4/2019 | Bramberger | G06Q 30/0248 |
| 2019/0278805 A1* | 9/2019 | Li | H04L 9/0643 |
| 2020/0092083 A1* | 3/2020 | Keskar | G06N 20/00 |
| 2020/0193441 A1* | 6/2020 | Mokhasi | G06Q 20/40 |
| 2020/0286082 A1* | 9/2020 | Cheng | G06Q 20/389 |
| 2020/0304559 A1* | 9/2020 | Ibryam | H04L 67/42 |

FOREIGN PATENT DOCUMENTS

| | | |
|---|---|---|
| CN | 108810901 A | 11/2018 |
| CN | 109361806 A | 2/2019 |
| CN | 110266872 A | 9/2019 |

\* cited by examiner

US 10,958,780 B1

DECENTRALIZED AUTOMATIC PHONE FRAUD RISK MANAGEMENT

BACKGROUND

Distributed ledger systems (DLSs), also referred to as consensus networks and/or blockchain networks, enable participating entities to store data securely and immutably. Examples of types of blockchain networks can include public blockchain networks, private blockchain networks, and consortium blockchain networks. A consortium blockchain network is provided for a selected group of entities that control the consensus process, and includes an access control layer.

Phone fraud, or more generally communications fraud, uses telecommunication devices or services for illegal purposes or in illegal manners. Types of phone frauds include autodialers, telemarketing fraud, caller ID spoofing, telephone scams, mobile phone spam, and other types of frauds against a customer, a telecommunication company or a third party. Phone fraud is conducted as scammers, pranksters, or even harassers. The recipients of such phone fraud may be selected based on their perceived vulnerability to be tricked by the phone fraud, or to not react properly. Sources of such phone frauds may include machine-triggered calls ("robocallers") or callers unknown to the recipients. However, not all robocallers or unknown callers are fraudulent or illegal.

Solutions have been proposed to identify and block phone fraud. For example, a list of fraud phone numbers may be stored at a local terminal device or a remote server, which is used to determine whether an incoming call to a user is fraudulent or not.

BRIEF SUMMARY

This specification describes technologies for managing phone fraud risk through a blockchain platform. In a computer-implemented method, a first identifier of a first phone event involving a first user is received at a blockchain platform. The first identifier is added to a list of phone fraud identifiers stored in a blockchain managed by one or more devices on a decentralized network. A second identifier of a second phone event involving a second user is received at the blockchain platform. The second identifier is compared with the list of phone fraud identifiers that includes the first identifier. Where the second identifier matches a phone fraud identifier in the list of phone fraud identifiers, the blockchain platform notifies the second user that the second phone event involves a risk of phone fraud.

A clear advantage of using a decentralized database of blockchain to store the list of fraud identifiers is fraud prevention. A blockchain prevents people from making fraudulent transactions that would seriously harm the system. With so many computing nodes maintaining their own copies of the ledger, inserting a fake transaction into the blockchain is almost impossible. In phone frauds, fraudulent entities also try to harm the system. For example, fraudulent entities may make fake reports of "fraud identifier" to a system to disturb the operation of the system. If a system contains too many "fraud identifiers" that are actually not fraudulent, the increased false positive detection of phone frauds will become unacceptable. In a blockchain network, with many computing nodes conducting the verification and validation in hashing a data entry, the chance of faked "fraud identifier" being hashed into the blockchain effectively shrinks to zero. Moreover, fraud identifiers stored in a blockchain cannot be modified at copy of ledger without being detected by other copies of ledgers. Further, because a blockchain keeps track of every hashed transaction as chained "blocks", the full processing history of a fraud identifier is available. For example, the full records of a fraud identifier being classified to a black list, a grey list or a white list or being removed from a black list, a grey list or a white list are all available to be viewed or audited through a blockchain. Also, the fraud identifiers are stored in copies of ledger across many computing nodes, which greatly improve the robustness of the system. Practically, the system will not fail in operation because those computing nodes do not all go down.

This specification also provides one or more non-transitory computer-readable storage media coupled to one or more processors and having instructions stored thereon, which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
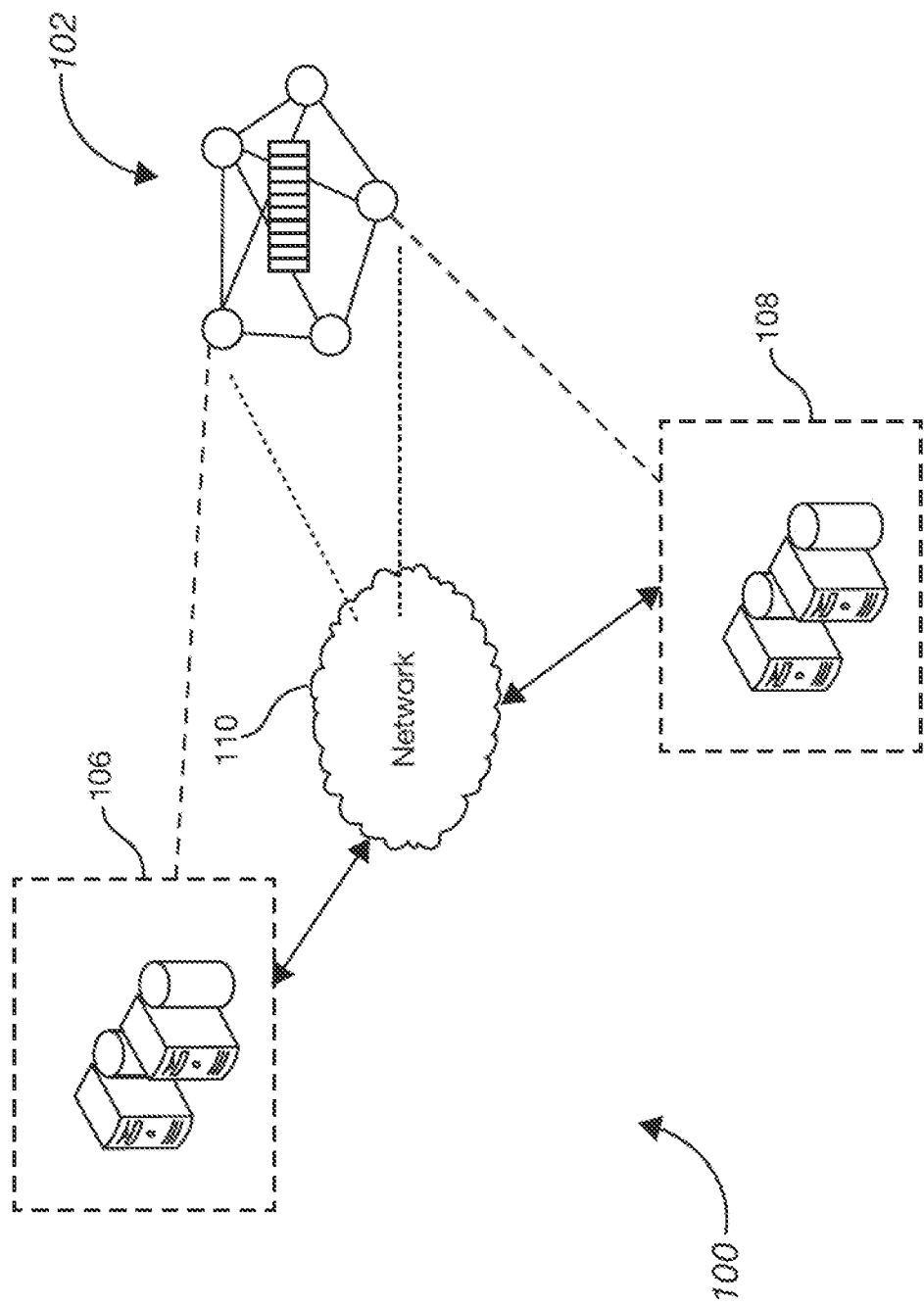
FIG. 1 is a diagram illustrating an example of an environment that can be used to execute embodiments of this specification.

This specification describes technologies for managing phone fraud risk through a blockchain platform. These technologies generally involve user terminal devices providing information about one or more instances of phone fraud to a blockchain network. For example, the information includes a caller identification ("caller ID") or a characteristic of a phone fraud event ("fraud fingerprints"), collectively referred to as "phone fraud identifiers." The phone fraud identifiers are each stored in the blockchain database as a block or a chain of blocks. The stored phone fraud identifiers are further classified into categories or lists of phone fraud identifiers. When a user device detects a caller ID or a fingerprint of an incoming phone event, the detected caller ID or fingerprint is compared with lists of fraud identifiers to assess whether the incoming phone event involves a phone fraud risk.

To provide further context for embodiments of this specification, and as introduced above, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which each leaf node is a hash on a corresponding transaction data block, and each non-leaf node is a hash on the concatenation of the hashes in its children. As a result, the root node represents all data blocks of data covered in the tree. A hash purporting to be of a transaction stored in the tree can be quickly verified by determining whether it is consistent with the structure of the tree.

Where a blockchain is a decentralized, or at least partially decentralized, data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes a plurality of computing devices 106, 108, and a network 110. In some examples, the network 110 includes a local area network (LAN), wide area network (WAN), the Internet, or a combination thereof, and connects web sites, user devices (computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the network 110 includes network hardware such as switches, routers, repeaters, electrical cables and optical fibers, light emitters and receivers, radio transmitters and receivers, and the like. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (user A), such as a transaction management system that the first entity uses to manage its transactions with one or more other entities (other users). The computing system 108 can host computer-implemented services of a second entity (user B), such as a transaction management system that the second entity uses to manage its transactions with one or more other entities (other users). In the example of FIG. 1, the consortium blockchain network 102 is represented as a peer-to-peer network of nodes, and the computing systems 106, 108 provide nodes of the first entity and second entity, respectively, which participate in the consortium blockchain network 102.

Figure 2:
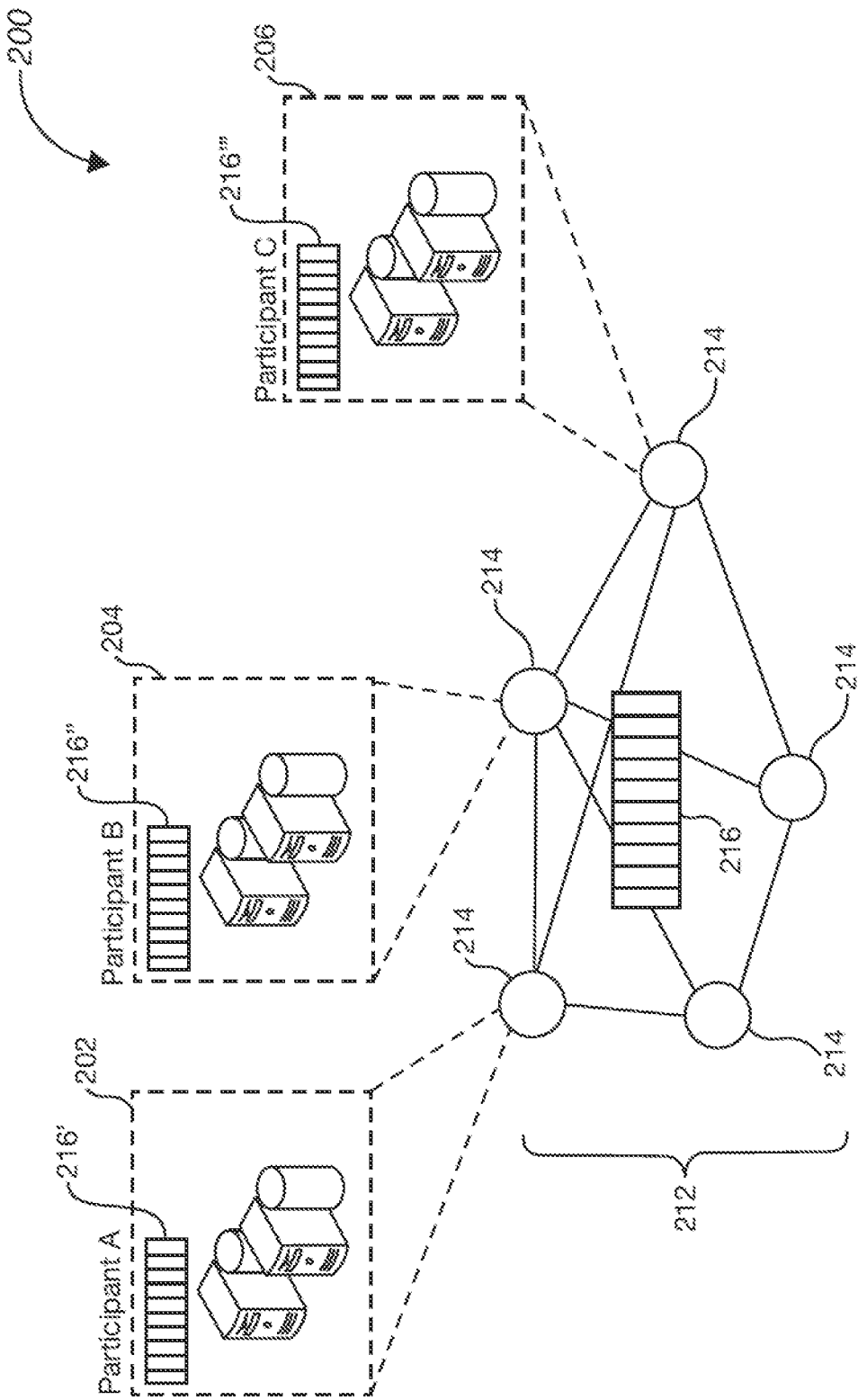
FIG. 2 is a diagram illustrating an example of an architecture in accordance with embodiments of this specification.

FIG. 2 depicts an example of an architecture 200 in accordance with embodiments of this specification. The example architecture 200 includes participant systems 202, 204, 206 that correspond to Participant A, Participant B, and Participant C, respectively. Each participant (user, enterprise, etc.) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of, Participant A, Participant B, and Participant C, respectively, and functions as a respective node 214 within the blockchain network 212.

As used herein, a node generally refers to an individual system (computer, server, etc.) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through, the blockchain network 212 using a protocol (hypertext transfer protocol secure (HTTPS)), and/ or using remote procedure calls (RPCs).

Nodes 214 can have varying degrees of participation within the blockchain network 212. For example, some nodes 214 can participate in the consensus process (as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216", 216''' of the blockchain 216. In the descriptions herein, nodes 214 of the blockchain network 212 are also referred to as "participant node" for descriptive purposes. In some embodiments, some or all of the participant nodes 214 participate in the consensus process and are referred to as "consensus nodes." The consensus nodes for the blockchain 216 may also include other nodes not selected from the participant nodes 214. In some other embodiments, consensus nodes for adding blocks to the blockchain 216 do not overlap with the participant nodes 214 that propose blocks to be added to the blockchain 216.

A blockchain, such as the blockchain 216 of FIG. 2, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (the last block added to the blockchain). The consensus node also adds a nonce value, and a timestamp to the block header.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

The blockchain environment 100 and/or the blockchain architecture 200 may be used to implement a phone fraud risk management system.

Figure 3:
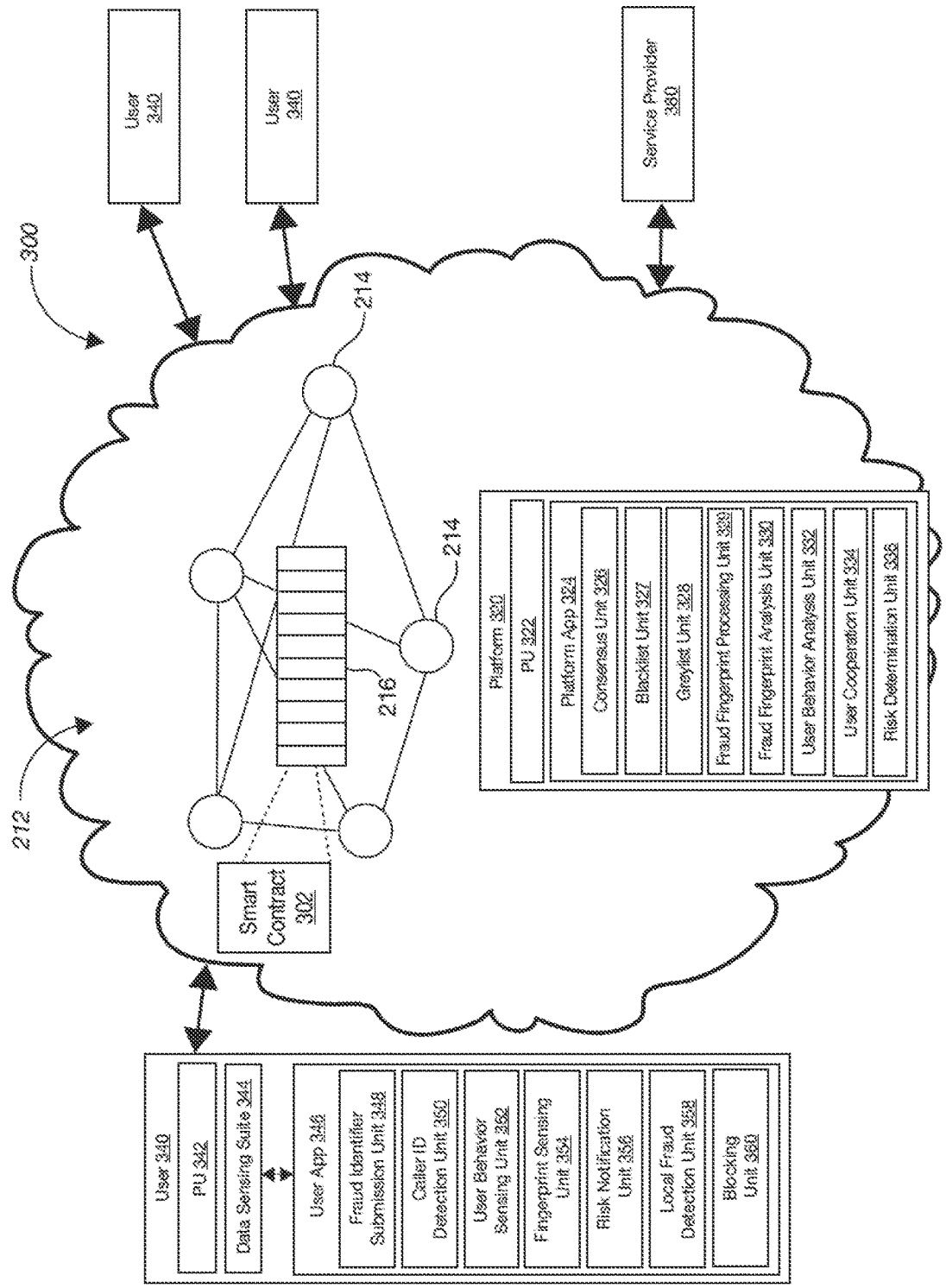
FIG. 3 is an example system of managing phone fraud risk in accordance with embodiments of this specification.

FIG. 3 is an example system 300 of managing phone fraud risk. The system 300 includes one or more blockchain platforms 320 and a plurality of users 340. In some embodiments, the system 300 may also include other service providers 380. A service provider 380 may include telecommunication carrier companies or other third-party service providers dedicated to provide services on detecting or blocking a phone fraud. A user 340 or the blockchain platform 320 may communicate with the service provider 380 in performing the functions thereof. For example, the blockchain platform 320 may obtain from the service provider 380 characteristics of a data routing path of a phone event. The blockchain platform 320 may also obtain from the service provider 380 the URI of a caller of a phone event. In some embodiments, a telecommunication carrier company may be a user 340 in a case where it joins the blockchain network 212. A carrier user 340 may be able to provide transaction information of fraud events that it collects from the phone service subscribers of the carrier user 340. In some embodiments, a telecommunication carrier company may also join the blockchain network as a computing node 214 to store a copy of the blockchain 216.

In some embodiments, the blockchain platform 320 is a computing device or a pool of computing devices that function to support the deployment of a blockchain network 212 that stores identifiers of phone frauds into the blockchain 216 at the ledgers of each computing nodes 214. The blockchain platform 320 provides the consensus protocols and rules for selecting computing nodes 214 to become consensus nodes for the blockchain 216. The blockchain platform 320 also provides software modules to the users 340 that implement user applications through the computing systems of the users 340. The user application deployed at the user 340 functions together with the blockchain platform 320 in determining and blocking a phone fraud. For example, a smart contract 302 stored in the blockchain 216 governs the cooperation between the user applications at the users 340 and the blockchain platform 320.

In some embodiments, the platform 320 is implemented as a virtual machine layer supported by one or more host computer systems. In some embodiments, at least some of the computing systems 202, 204, 206 of the computing nodes 214 together host a virtual machine layer implementing at least a portion of the blockchain platform 320. In some embodiments, an entity may operate one or more server computer systems that implement, as a physical machine or a virtual machine, at least a portion of the blockchain platform 320.

The platform 320 includes a processing unit 322 and a platform application 324. The platform application 324 may include software units each having executable codes separately stored and dedicated for implementing a task or tasks of the software units. For example, the platform application includes a consensus unit 326; a blacklist unit 327; a greylist unit 328; a fraud fingerprint processing unit 329; a fraud identifier analysis unit 330; a user behavior analysis unit 332; a user cooperation unit 334; and a risk determination unit 336. The units of the platform application 324 may reside on a same computing device or may reside on multiple computing devices coupled together in a distributed computing environment. In some embodiments, the units of the platform application 324 are implemented as application level virtual machines supported by a plurality of host computing devices.

In some embodiments, the user 340 is a computing system that includes a processing unit 342, a data sensing suite 344 and a user application 346. The data sensing suite 344 includes sensors and/or other data sensing devices that are embedded in a computing device of the user 340 or coupled to the computing device through electrical or communicational coupling links. For example, the data sensing suite 344 may include radar sensors, motion sensors, gesture sensors, bio-characteristic sensors, temperature sensors, pressure sensors, range sensors, RFID sensors, audio sensors, video sensors, software data sensors, web crawlers, or other sensors or sensing devices.

The sensors of data sensing suite 344 are configured to automatically obtain a caller identifier ("caller ID") of an incoming phone event. A caller ID includes, but is not limited to, a caller's phone number, a caller's name, an IP address of a caller's device for a VoIP call, a Uniform Resource Identifier ("URI") of a caller's device for a VoIP call, or other caller identifiers.

The sensors of data sensing suite 344 are configured to detect or obtain a behavior characteristic of a user with respect to or in response to an incoming phone event, e.g., a voice call, a voice message, or a text message. Such user behavior characteristic may indicate whether the user treats the incoming phone event as involving a phone fraud or as having a risk of phone fraud. For example, if the data sensing suite 344 detects that the user hangs up the phone within a very short period of time after accepting an incoming voice call, such as 2 seconds, it may be determined that the user treats the incoming call as a scam call. For another example, a motion sensor and a face recognition sensor together may detect that a user flips a cell phone to silence its ring right after he/she sees the caller ID. Those and other user behavior characteristics in handling a phone event tend to indicate that the user treats the phone event as fraudulent.

Further, sensors of the data sensing suite 344 are configured to detect or obtain a distinguishing characteristic ("fingerprint") of the phone event itself. For example, an audio sensor may detect an audio characteristic of a received phone call or voice message. An audio characteristic may include a voice pattern, a sound characteristic or a speech pattern of the received phone call or voice message. Such voice pattern or sound characteristic, if determined as related to a phone fraud, may be used as an identifier to identify a source of the phone fraud. For another example, a speech pattern may indicate whether a speech is made by a human caller or a robocaller. For example, a robocaller tends to continue speaking without responding to an interrupting signal or sign, either generated by the machine or made by a user. For another example, a robocaller tends to always start speaking after a fixed time interval upon detecting that the incoming call is picked up. Such distinguishing characteristics of the phone event are detected as fingerprints of the phone event.

In some embodiments, a user 340 is a telecommunication carrier company. The carrier user 340 includes data sensors that can track the data transmission patterns or characteristics of a phone event. For example, under the popular Voice over Internet Protocol ("VoIP"), a fraudulent caller may use a fake caller ID, e.g., a fake phone number, to disguise the real source of the fraudulent phone event. The fake caller IDs can be frequently changed with ease, which makes it harder to detect a phone fraud event. A data sensing suite 344 of a carrier user 340 detects a Unique Resource Identifier ("URI") of a phone event implemented under Session Initiation Protocol ("SIP"). Further, the data sensing suite 344 of a carrier user 340 also tracks the data traffic path of a data packet as a fingerprint of the phone event. The data traffic path or some specific nodes in the data traffic path may be determined as fingerprint of the phone fraud. For another example, if it is detected that a caller node concurrently sends packets to a plurality of recipients, the caller node may be determined as a robocaller.

In the description herein, the distinguishing characteristics of an incoming phone event, including but not limited to voice pattern, sound characteristics, the data transmission characteristics, the caller behavior, are generally referred to as phone event fingerprint. When a phone event fingerprint is determined as related to a phone fraud, the phone event fingerprint is referred to as a "fraud fingerprint," for descriptive purposes.

In some embodiments, the data sensing suite 344 directly communicates with the user application 346 such that the user application 346 obtains the user behavior data, the phone event fingerprint, and/or the caller ID directly from the data sensing suite 344. In some embodiments, the user application 346 selectively obtains data from the data sensing suite 344 based on a smart contract 302. For example, the smart contract 302 may specify what types of caller ID, user behavior or fingerprint data can be batched into the blockchain 216.

In some embodiments, the user application 346 includes software units of a fraud identifier submission unit 348, a caller ID detection unit 350, a user behavior sensing unit 352, a fingerprint sensing unit 354, a risk notification unit 356, a local fraud detection unit 358, and a blocking unit 360.

In some embodiments, the user application 346 and the software units thereof are deployed on the computing device of the user 340 using software modules provided by the platform. The user application 346 of the user 340 and the platform application 324 of the platform 320 are communicatively coupled in the respective operations, and are functionally linked together through the smart contract 302. For example, the smart contract 302 provides the data formats for the data communication between the user application 346 and the platform application 324. The smart contract 302 also specifies the standards or criteria for the user behavior sensing unit 352 to detect a user behavior with respect to an incoming call. The smart contract 302 also specifies the standards or criteria for the fingerprint sensing unit 354 to detect a fingerprint of a phone event.

Operations and functions of the software units of the blockchain platform 320 and/or the user 340 are further described herein.

Figure 4:
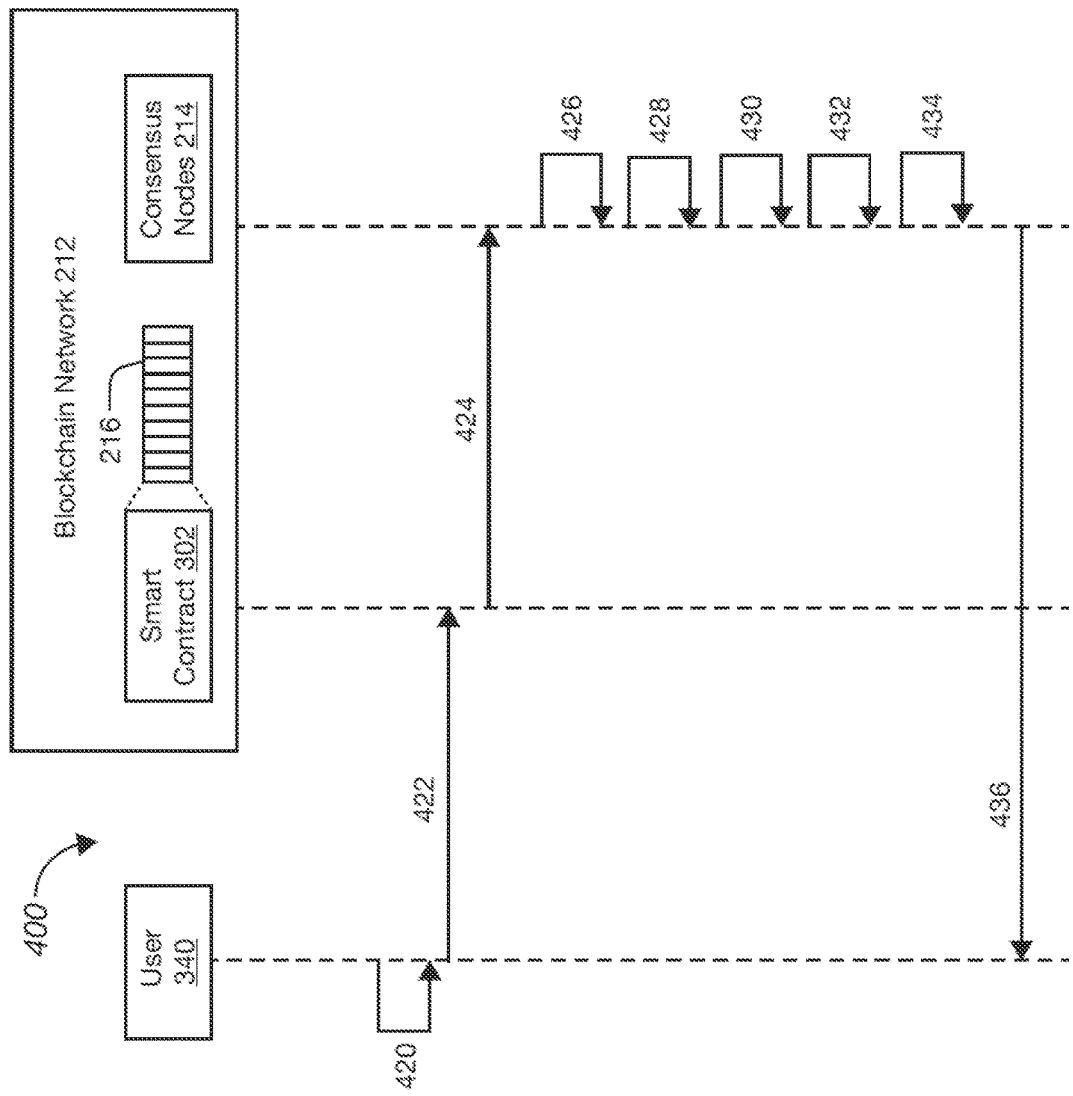
FIG. 4 schematically shows an example process of submitting fraud event identifiers to a blockchain in accordance with embodiments of this specification.

FIG. 4 shows an example process 400 of submitting an identifier of a fraud event to the blockchain 216. In some embodiments, the process 400 is implemented through the blockchain network 212 supported by the blockchain platform 320. The smart contract 302 is stored as a certified transaction in a block or in a chain of blocks of the blockchain 216 maintained by the blockchain network 212.

In operation 420, the fraud identifier submission unit 348 of a user 340 generates a batch of transaction information of a fraud event locally at the user 340. In some embodiments, the batch of transaction information is generated based on the requirements or provisions of the relevant smart contract 302 such that the batch of transaction information is ready to be hashed into the blockchain 216 upon consensus being concluded. In the specification herein, for descriptive purposes, the locally generated batch of transaction information is referred to as a "proposed block" indicating that the transaction information is batched in a manner as required by the smart contract 302 to be added to the blockchain 216. The local processing of the transaction data at the user 340 splits the data processing burden between the user 340 and the blockchain platform 320, which saves computation resources of the blockchain platform 320. Further, the proposed block is generated based on the requirements of the smart contract 302, which facilitates the verification and validation of the transaction information contained in the proposed block. As such, the consensus process is expedited and the delay in concluding a consensus in hashing the transaction information batched in the proposed block is substantially reduced. These technical advantages ensure the smooth operation of the blockchain platform 320 especially where the number of the users 340 reaches the scale of millions or even hundreds of millions.

In some embodiments, the proposed block contains transaction data of a fraud event and an identification of the user 340, e.g., a phone number of the user 340. In some embodiment, the transaction data includes an identifier of the fraud event and other information of the fraud event. The identifier of the fraud event includes one or more of a caller ID or a fraud fingerprint of the fraud event. Each of the caller ID or the fraud fingerprint may include multiple categories. For example, the caller ID may include the phone number, the URI number, the IP address, or other identification of the caller. The fraud fingerprint may include an audio characteristic (e.g., a sound characteristic, a voice pattern, or a speech pattern), a data communication path, or other distinguishing characteristics of the fraud event.

In some embodiments, the proposed block also includes user behavior data indicating user's behavioral characteristics with respect to the fraud event. The user behavior data may include various categories, e.g., user turning off a call within a preset period of time after picking up the call, user leaving a call unanswered, user silencing a call, user deleting a message within a preset period of time after reading the message, or other user behavioral characteristics indicating that the user treats the phone event as fraudulent.

In some embodiments, the proposed block also contains data indicating whether the fraud event is identified manually by a user or automatically by the user application 346. The local fraud detection unit 358 functions to automatically determine that a phone event is fraudulent based on the user behavior data. In some embodiments, although a user does not manually identify a phone event as fraudulent or does not manually submit the phone fraud to the blockchain network 212, the local fraud detection unit 358 determines that the user treats the phone event as fraudulent, based on behaviors of the user that are detected by the data sensing suite 344 and collected by the user behavior sensing unit 352. Such an automatically determined phone fraud event may also be included in a proposed block and may be identified as an automatically determined phone fraud as compared to a manually determined phone fraud.

In some embodiments, fraud identifier classification may assign greater weight to a manually determined fraud event than an automatically determined fraud event, as further described herein.

In some embodiments, the different categories of the fraud event identifiers are batched into separate proposed blocks.

In some embodiments, the proposed block also contains an identification of the smart contract 302 as applicable to hashing the transactions of the fraud phone events.

In example operation 422, the proposed block is provided to the blockchain network 212 supported by the platform 320. In some embodiments, the proposed block is linked to the smart contract 302 when received by the blockchain network 212, e.g., by a smart contract ID contained in the proposed block.

In example operation 424, the smart contract 302 is provided or identified to the consensus nodes 214 of the blockchain network 212. For example, the blockchain 216 may store multiple smart contracts 302 for different types of phone fraud events, e.g., autodialers, telemarketing fraud, caller ID spoofing, telephone scams, or mobile phone spam. A phone event may be treated as fraudulent by one user and may be treated as legitimate by another user. For example, a same caller ID may be used for a fraudulent call to a specific user and may be used for legitimate calls to other users. The proposed blocks contain identifications of the smart contract 302 dedicated for the different types of the phone frauds. Such identifications of the smart contract 302 are identified to the consensus nodes 214 to determine the relevant consensus algorithm in verifying and validating the transaction information contained in the proposed block.

In example operation 426, the consensus unit 326 coordinates the consensus nodes 214 of the blockchain network 212 in a consensus process to hash the proposed blocks into the blockchain 216. Depending on the smart contract 302, the caller ID, the fraud fingerprint, or the user behavior data may be hashed into separate blocks in the blockchain 216.

In example operation 428, the blacklist unit 327 determines whether an identifier of a phone fraud is classified or added to a black list. The black list contains phone fraud identifiers, e.g., caller IDs or fraud fingerprints, which are determined to be linked to phone frauds with higher certainty. For example, the blacklist unit 327 applies a counter to determine how many time a caller ID is reported as fraudulent by users 340. When the counter reaches a first threshold value, e.g., 20, the caller ID is classified into or added to the black list of caller IDs. The blacklist is stored in the blockchain 216 in a separate chain of blocks or is implemented as an additional block hashed to the original block of the caller ID, indicating a status of the caller ID as being classified into the black list.

In some embodiments, for a fraud fingerprint, the fraud fingerprint processing unit 329 conducts further data processing before the fraud fingerprint is classified or added to a black list. For example, a recorded voice sample, used for a sound characteristic or a speech pattern of a caller, may be processed with other voice samples of the same caller to obtain portions of the recorded voice sample that are representative to the caller. Various text-independent voice analysis methods may be used to analyze the recorded voice sample. Such methods include, but are not limited to, frequency estimation, Gaussian mixture models, pattern matching, neutral networks, vector quantization, hidden Markov models, or other suitable solutions.

The blacklist unit 327 may also apply a counter to accumulate the times a fraud fingerprint is reported by users 340, either a same user 340 or different users 340.

In some embodiments, a manually determined fraud event may have a greater weight than an automatically determined fraud event in the counter accumulation. For example, an automatically determined fraud event, e.g., by the local fraud detection unit 358 using collected user behavior data, may be discounted as a 0.5 counter value, while a manually determined fraud event may be counted as a 1 counter value.

In some embodiments, the counter is applied for a preset time interval. Counter entries outside the time interval may be removed. For example, the counter of fraudulent reports is set for 15 days. If a caller ID is reported as fraudulent more than 20 times within a 15 day period of time, the caller ID is added to the black list. In any of such counters, a report of fraud event older than 15 days will not be counted.

In some embodiments, the counter may differentiate between a reporting of a fraud identifier by a same user 340 or by different users 340. A repeated reporting of a same fraud identifier by a same user 340 may be discounted in the accumulation.

In example operation 430, the greylist unit 328 determines whether an identifier of a phone fraud is added or classified into a grey list. The grey list contains phone fraud identifiers, e.g., caller IDs or fraud fingerprints, that are determined to be linked to phone frauds with lower certainty that those in the black list. In some embodiments, the grey list is also determined based on a counter value, which accumulates the times a caller ID or a fingerprint is reported as fraudulent within a certain period of time. The thresholds for classifying a phone fraud identifier into the grey list tend to be lower than those for the black list.

In example operation 432, the fraud identifier analysis unit 330 analyzes the fraud fingerprint data stored in the blockchain 216. The fraud fingerprint data may first be classified into different categories, e.g., voice, text content, speech pattern, etc., the fraud fingerprint entries in each category may then be statistically analyzed based on factors like a region of the user 340, a region of the caller, a time of fraud event, etc. The classification and statistical analysis results may be used to individualize the risk level of each caller ID or fraud fingerprint for a user 340. The classification and analysis results may also be used to update the user application 346. For example, the user application 346 may be updated regarding what fraud fingerprint data category should be collected.

In some embodiments, operations 428, 430, 432 each are conducted based on the smart contract 302 or other smart contracts. The smart contracts are agreed upon among the computing nodes 214 and/or between the user 340 and the platform 320. In some embodiments, the relevant smart contracts among the computing nodes 214 with respect to the operations 428, 430, 432 become part of the consensus algorithm or consensus protocol of the blockchain 212. The various uses of smart contracts are all included in the specification.

In some embodiments, operations 428, 430, 432 each include individualized analysis based on the identification of user 340. For example, in a case that a fraud identifier is reported multiple times by a specific user 340 as fraudulent, while not reported by other users 340, the fraud identifier may be classified into a black list or a grey list of fraud identifiers for the specific user 340. The individualized classification and analysis of fraud identifiers greatly improves user experience and user loyalty with the blockchain platform 320. The direct communication between the users 340 and the blockchain platform 320 facilitates the individualized data processing and analysis with efficiency. For example, the batched transaction information of the proposed block already contains the user identification, based on the smart contract 302, which facilitates the individualized data processing.

In some embodiments, the individualized data processing also analyzes the fraud reporting behavior of a user 340. For example, an average number of fraud reporting is obtained among users 340 for a given period of time. If a user 340 reports much more fraud identifiers than the average number, a red flag may be attached to the user 340. Further analysis may be conducted to determine whether the user 340 has malicious intent in reporting the abnormally large number of fraud identifiers. The use of the blockchain 216 greatly facilitates this individualized analysis of the fraud reporting behaviors of users 340. For example, the hashing of the proposed block into the blockchain 216 naturally includes a time stamp indicating a time of the fraud reporting. The proposed block batches the identification of the user 340, which is readily for individualized analysis.

In example operation 434, the user behavior analysis unit 332 analyzes the user behavior data stored in the blockchain 216. The user behavior data is classified into different categories, e.g., turning off call, silencing phone ring, switching to message folder, etc. The user behavior categories are statistically analyzed to determine the likely user behavior in response to a fraud event. The user behavior categories may be analyzed based on different types of phone frauds, and based on different users. The classification and analysis results may be used to update the user application 346. For example, the user application 346 may be updated regarding what user behavior data category should be collected.

In example operation 436, the user cooperation unit 334 provides software and data updates to the user 340. In some embodiments, the black list and the grey list of caller IDs may be provided to the user 340 for local determination of fraud risk. The lists of the fraud fingerprints are not be provided to the user 340 because the user 340 does not have the required computing capacity to determine a fraud event using the stored fraud fingerprints. For another example, the user application 346 may be updated with respect to responding to a potential fraud event. For example, the local fraud detection unit 358 may be updated to specify that a specific user behavior is more likely to be corresponsive a type of phone fraud, e.g., scam call, than other user behavior.

Figure 5:
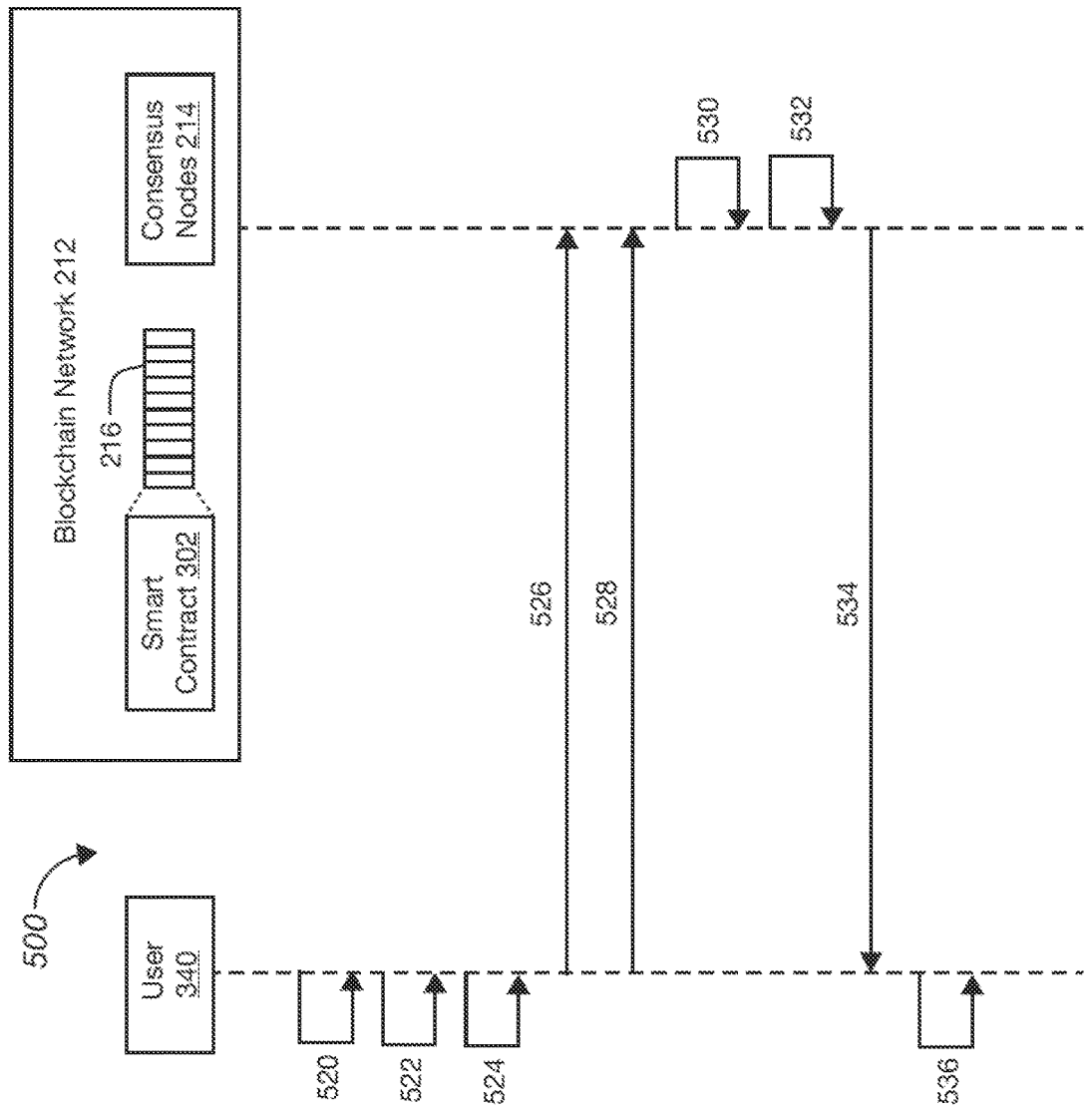
FIG. 5 schematically shows an example process of blocking a fraud event in accordance with embodiments of this specification.

FIG. 5 shows an example process 500 of blocking a fraud event. In some embodiments, the process 500 is implemented through the blockchain network 212 supported by the blockchain platform 320.

In operation 520, the user device 340 detects an incoming phone event, e.g., an incoming voice call.

In operation 522, the caller ID detection unit 350 determines a caller ID of the incoming phone event. The caller ID may include a phone number, a caller name, an URI, an IP address, or other identifications of the caller or the device used for the phone event. In some embodiments, the caller ID detection unit 350 detects a type of caller ID based on the smart contract 302. For example, the caller ID detection unit 350 detects a type or category of caller ID corresponding to the types of caller IDs contained in the black list or grey list of caller IDs. The smart contract 302 provides such information of the gray list or the black list. In some embodiments, the caller ID detection unit 350 coordinates or communicates with the service provider 380 in determining the caller ID of the incoming phone event. For example, the service provider may obtain the URI of the incoming phone event.

In operation 524, the fingerprint sensing unit 354 determines a fingerprint of the incoming phone event. The fingerprint may include a sound characteristic, a voice pattern, a speech pattern, a data transmission pattern, a data transmission node, or other characteristics of the incoming phone event. In some embodiments, the fingerprint sensing unit 354 detects a fingerprint of the incoming phone event based on the smart contract 302. For example, the fingerprint sensing unit 354 detects a type or category of fingerprint data corresponding to the types of fraud fingerprints contained in the back list or grey list of fraud fingerprints. The smart contract 302 may provide such information of the grey list or the black list.

Some of the fingerprints of the incoming phone event may be able to be detected before the user 340 accepts the phone event. For example, the data transmission path of the data packet for a VoIP call may be determined before the voice call is answered. Some other fingerprints may only be determined after the incoming phone event is accepted or starts. For example, a sound characteristic or a voice pattern of a voice call or message can only be detected after the voice call session has started.

In some embodiments, the fingerprint sensing unit 354 records an audio clip of voice sample of the incoming phone event and uses the recorded audio clip as the fingerprint of the incoming phone event.

In some embodiments, operation 522 and operation 524 are conducted concurrently. In some embodiments, operation 524 is conducted after operation 522 is conducted. That is, the user 340 first determines the caller ID to be used for fraud determination. Fraud determination using a caller ID costs less computation resources than fraud determination using a fingerprint.

In example operation 526, the determined caller ID of the incoming phone event is provided to the blockchain platform 320.

In example operation 528, the determined fingerprint of the incoming phone event is provided to the blockchain platform 320.

In example operation 530, the risk determination unit 336 determines a risk of phone fraud by comparing the caller ID of the incoming phone event to the blacklist and/or the grey list of caller IDs to determine whether the determined caller ID of the incoming phone event involves phone fraud risk. In some embodiments, the caller ID of the incoming phone event is first compared with the black list before being compared with the grey list.

In example operation 532, the risk determination unit 336 determines a risk of phone fraud by comparing the fingerprint of the incoming phone event to the black list and/or the grey list of fraud fingerprints. For the audio-based fingerprints, like a voice pattern fingerprint, various text-independent voice analysis methods are used to compare fingerprint of the incoming phone event with the stored fraud fingerprints. Such methods may include, but are not limited to, frequency estimation, Gaussian mixture models, pattern matching, neutral networks, vector quantization, hidden Markov models, or other suitable solutions.

In each of operations 530, 532, when the risk determination unit 336 finds a match in the black list, the respective phone event will be classified as having a risk of a fraud event. When the risk determination unit 336 founds a match in the grey list, the respective phone event will be classified as having a risk of a possible fraud event.

In example operation 534, the determined phone fraud risk is sent to the user 340.

In example operation 536, the blocking unit 360 of the user 340 conducts a fraud prevention procedure based on the determined phone fraud risk. In some embodiments, the fraud prevention procedure treated a fraud event, i.e., a black list matching, differently from a possible fraud risk, i.e., a grey list matching. In some embodiments, the risk notification unit 356 presents a fraud notification message to the user, e.g., through a user interface. The risk notification unit 356 also presents options for the user to handle the possible phone fraud, e.g., options of rejecting the phone event, continuing the phone event or converting the phone event to a message folder. For a phone fraud, i.e., a black list matching, the blocking unit 360 may automatically rejecting the incoming phone event or converting the incoming phone event to a message folder and the risk notification unit 356 may notify the user about the phone fraud after the blocking unit 360 has automatically blocked the incoming fraud phone event.

In some embodiments, the blocking units 360 of users 340 are individualized based on the individualized analysis of user behaviors responsive to fraud events. For example, the blocking unit 360 of a first user 360 may be individualized to automatically silence an incoming call that is determined as fraudulent by the blockchain platform 320. The blocking unit 360 of a second user 340 may be individualized to automatically transfer an incoming call to a message folder if the incoming call is determined as fraudulent by the blockchain platform 320.

Figure 6:
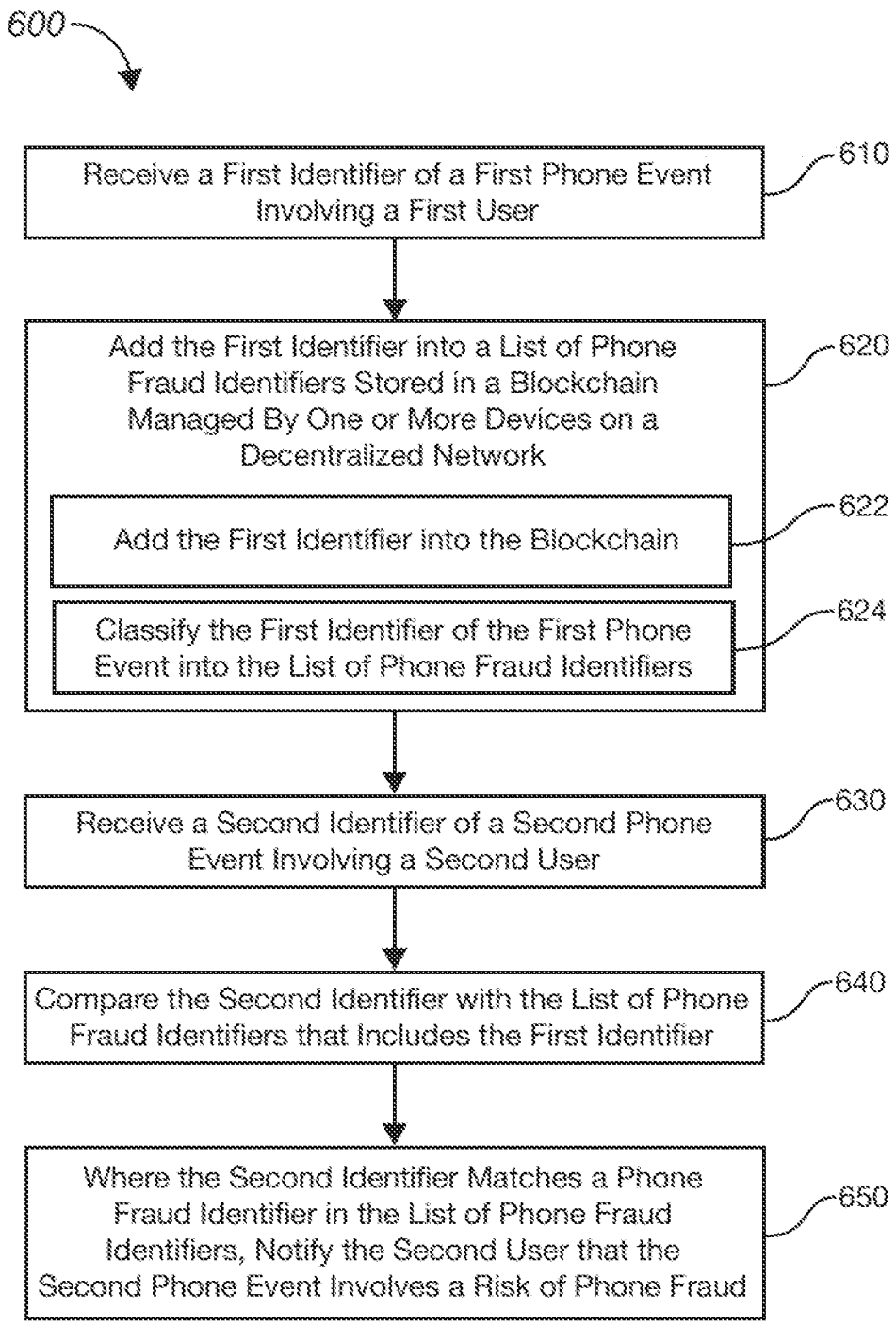
FIG. 6 is a flow diagram of an example method in accordance with embodiments of this specification.

FIG. 6 is a flow diagram of an example method 600. For convenience, the method 600 will be described as being performed by a system of one or more computers, located in one or more locations, and programmed appropriately in accordance with this specification. For example, the acts of the method 600 are performed by the blockchain platform 320.

In example act 610, the blockchain platform 320 receives a first identifier of a first phone event involving a first user 340. In some embodiments, the first identifier is received from the first user 340. The first identifier includes one or more of a caller ID of a caller of the first phone fraud event or a fingerprint of the phone fraud event. The fingerprint includes a distinguishing characteristic of the first phone fraud event in audio content, text content, data communication path, or other characteristics of the first phone fraud event. In some embodiments, the first identifier information of the first phone fraud event is locally processed and is assembled into a proposed block(s) at the first user 340 before being sent to the blockchain platform 320. In some embodiments, the first identifier is received from a third party other than the first user 340 that the first phone event involves. For example, the first identifier of a first phone event may be received from a telecommunication carrier company as a service provider 380 in the system 300.

In example act 620, the first identifier is added to a list of phone fraud identifiers stored in the blockchain 216 that is managed by one or more computing nodes 212 on a decentralized network. In some embodiment, the example act 620 includes two sub-acts 622, 624. In example sub-act 622, the consensus unit 326 coordinates with the consensus nodes 214 in conducting a consensus process to add the proposed block containing the first identifier into the blockchain 216.

In example sub-act 624, the blacklist unit 327 or the greylist unit 328 classifies the first identifier of the first phone event into a list of phone fraud identifiers. In some embodiments, the list of phone fraud identifiers includes a black list or a grey list. In some embodiments, different types of phone fraud identifiers are classified into different lists. For example, a caller ID is classified into a black list or a grey list of fraud caller IDs. A fraud fingerprint is classified into a black list or a grey list of fraud fingerprints. Different types of caller IDs, e.g., phone number, IP address, or URI, are also classified into different lists. In some embodiments, the classification is implemented by adding a classification block to the blockchain containing the respective phone fraud identifier.

In example act 630, the blockchain platform 320 receives a second identifier of a second phone event involving a second user 340. The identifier may be one or more of a caller ID or a fingerprint of the incoming phone event. The second user 340 may be a same user as the first user 340 or may be a different user from the first user 340.

In example act 640, the risk determination unit 336 compares the second identifier with the list of phone fraud identifiers that includes the first identifier. Different types of second identifiers of the second phone event are compared to respective different lists of phone fraud identifiers.

In example process 650, in a case where the second identifier matches a phone fraud identifier in the list of phone fraud identifiers, the blockchain platform 320 notifies the second user that the second phone event involves a risk of phone fraud for the second user 340 to start a phone fraud prevention process.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

The techniques described in this specification produce one or more technical effects. In some embodiments, the users 340 of different telecommunication carrier companies or having different types of user devices all communicate directly with the blockchain network 212 or the blockchain platform 320 to submit the identifiers of phone frauds to be stored at the blockchain 216. As such, the lists of fraud identifiers in the blockchain are more comprehensive and are immune from the competitions among the telecommunication carrier companies. The users also communicate directly with the blockchain platform 320 or the blockchain network 212 to submit identifiers of incoming phone events to be compared with the stored phone fraud identifiers to determine whether the incoming phone frauds involves risks of phone fraud. The direct communications between the users and the blockchain platform or the blockchain network enables the resources sharing among users of different telecommunication carrier companies, which facilitates phone fraud prevention. Further, the data communications between the users 340 and the blockchain platform 320/blockchain network 212 are governed by the smart contract 302, which harmonizes the various data formats or instruction structures of various user devices 340. Resultantly, the data processing tasks at the blockchain platform 320 or the blockchain network 212 are substantially simplified with reduced computation overheads. For example, the blockchain platform 320 does not need to conduct data harmonization before storing the phone fraud identifier data received from various users 340. The reduced computation overhead at the blockchain platform 320 enables the whole system 300 be operated more smoothly and efficiently, which also improves user experience in phone fraud prevention. For example, the phone fraud screening of an incoming phone event can be completed faster and without causing undue delay for a user to respond to the incoming phone event.

The classification of a fraud identifier into a black list or other list of fraud identifiers is stored in the blockchain, which cannot be changed at one computing node without being noticed by other computing nodes. Moreover, the classification of a fraud identifier is easily updated through a new block of classification status added to the existing blockchain. The complexity of the database management of the black list or other lists of fraud identifiers is thus simplified. Relevant computing resources are saved. Further, the stored fraud identifiers are linked to the users who submit them to the blockchain. The classifications of the fraud identifiers and the use of the classified fraud identifiers in fraud prevention can thus be individualized based on each user. User behaviors responsive to fraud events are detected and stored in the blockchain. Fraud prevention is thus implemented in an individualized manner based on the stored user behaviors. The individualized fraud identifier classification and fraud prevent enhances user experience.

Described embodiments of the subject matter can include one or more features, alone or in combination. For example, in a first embodiment, a computer-implemented method includes receiving a first identifier of a first phone event involving a first user. The first identifier is compared with a list of phone fraud identifiers stored in a blockchain managed by one or more devices on a decentralized network. Where the first identifier matches a phone fraud identifier in the list of phone fraud identifiers, the first user is notified that the first phone event involves a risk of phone fraud.

The foregoing and other described embodiments can each, optionally, include one or more of the following features:

A first feature, combinable with any of the following features, specifies that the method further includes receiving a second identifier of a second phone event involving a second user and adding the second identifier to the list of phone fraud identifiers stored in the blockchain.

A second feature, combinable with any of the following features, specifies that the second identifier includes a caller identification of the second phone event or a fingerprint of the second phone event.

A third feature, combinable with any of the previous or following features, specifies that the fingerprint of the second phone event includes an audio characteristic of the second phone event.

A fourth feature, combinable with any of the previous or following features, specifies that the second identifier is received from the second user based on a smart contract stored in the blockchain.

A fifth feature, combinable with any of the previous or following features, specifies that the method further comprises adding a second user behavior with respect to the second phone event into the blockchain.

A sixth feature, combinable with any of the previous or following features, specifies that the adding the second identifier into the list of phone fraud identifiers includes adding the second identifier into the blockchain and classifying the second identifier into the list of phone fraud identifiers.

A seventh feature, combinable with any of the previous or following features, specifies that the classifying includes, based on a smart contract stored in the blockchain, accumulating a number of times the second identifier has been added to the blockchain and comparing the number with a threshold number to determine whether the second identifier is classified into the list of phone fraud identifiers.

An eighth feature, combinable with any of the previous or following features, specifies the second identifier is received directly from the second user.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform operations or actions. For one or more computer programs to be configured to perform particular operations or actions means that the one or more programs include instructions that, when executed by data processing apparatus, cause the apparatus to perform operations or actions. For special-purpose logic circuitry to be configured to perform particular operations or actions means that the circuitry has electronic logic that performs operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method, the method comprising:
   receiving a first identifier of a first phone event involving a first user;
   comparing the first identifier with a list of phone fraud identifiers stored in a blockchain managed by one or more devices on a decentralized network; and
   in response to the first identifier matches a phone fraud identifier in the list of phone fraud identifiers, notifying the first user that the first phone event involves a risk of phone fraud;
   receiving a second identifier of a second phone event involving a second user and a behavior of the second user in the second phone event;
   adding the second identifier the blockchain based on the behavior of the second user in the second phone event;

accumulating a number of times the second identifier has been added to the blockchain; and
comparing the number of times with a threshold number to determine whether the second identifier is classified into the list of phone fraud identifiers.

2. The method of claim 1, wherein the second identifier includes a caller identification of the second phone event or a fingerprint of the second phone event.

3. The method of claim 2, wherein the fingerprint of the second phone event includes an audio characteristic of the second phone event.

4. The method of claim 1, wherein the second identifier is received from the second user based on a smart contract stored in the blockchain.

5. The method of claim 1, further comprising adding a second user behavior with respect to the second phone event into the blockchain.

6. The method of claim 1, wherein the second identifier is received directly from the second user.

7. The method of claim 1, wherein the behavior of the second user includes one or more of the second user turning off a call within a preset period of time after picking up the call, the second user leaving a call unanswered, the second user silencing a call, or the second user deleting a message within a period of time after reading the message.

8. The method of claim 1, comprising determining whether the second user treats the second phone event as a fraudulent event based on the behavior of the second user.

9. The method of claim 1, comprising automatically detecting the behavior of the second user by a user terminal of the second user that is linked to the blockchain through a device of the one or more devices of the decentralized network.

10. A system, comprising:
one or more processors; and
one or more computer-readable memories coupled to the one or more processors and having instructions stored thereon that are executable by the one or more processors to perform acts including:
receiving a first identifier of a first phone event involving a first user;
comparing the first identifier with a list of phone fraud identifiers stored in a blockchain managed by one or more nodes on a blockchain network;
in response to the first identifier matches a phone fraud identifier in the list of phone fraud identifiers, notifying the first user that the first phone event involves a risk of phone fraud;
receiving a second identifier of a second phone event involving a second user and a behavior of the second user in the second phone event;
adding the second identifier to the blockchain based on the behavior of the second user in the second phone event;
accumulating a number of times the second identifier has been added to the blockchain; and
comparing the number of times with a threshold number to determine whether the second identifier is classified into the list of phone fraud identifiers.

11. The system of claim 10, wherein the second identifier includes a caller identification of the second phone event or a fingerprint of the second phone event.

12. The system of claim 11, wherein the fingerprint of the second phone event includes an audio characteristic of the second phone event.

13. The system of claim 10, wherein the second identifier is received from the second user based on a smart contract stored in the blockchain.

14. The system of claim 10, wherein the acts include adding a second user behavior with respect to the second phone event into the blockchain.

15. The system of claim 10, wherein the second identifier is received directly from the second user.

16. The system of claim 10, wherein the behavior of the second user includes one or more of the second user turning off a call within a first preset period of time after picking up the call, the second user leaving a call unanswered, the second user silencing a call, or the second user deleting a message within a second preset period of time after reading the message.

17. The system of claim 10, wherein the acts include determining whether the second user treats the second phone event as a fraudulent event based on the behavior of the second user.

18. The system of claim 10, wherein the behavior of the second user is automatically detected by a user terminal of the second user that is linked to the blockchain through a device of the one or more nodes of the blockchain network.

* * * * *